(12) United States Patent
Konaka et al.

(10) Patent No.: US 11,368,063 B2
(45) Date of Patent: Jun. 21, 2022

(54) ROTOR OF ELECTRIC MOTOR AND ELECTRIC MOTOR

(71) Applicant: Fanuc Corporation, Yamanashi (JP)

(72) Inventors: Yuudai Konaka, Yamanashi (JP); Kenji Kawai, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 104 days.

(21) Appl. No.: 16/849,420

(22) Filed: Apr. 15, 2020

(65) Prior Publication Data

US 2020/0336029 A1    Oct. 22, 2020

(30) Foreign Application Priority Data

Apr. 17, 2019    (JP) .............................. JP2019-078662

(51) Int. Cl.
*H02K 1/27* (2022.01)
*H02K 1/28* (2006.01)
*H02K 1/278* (2022.01)

(52) U.S. Cl.
CPC .............. *H02K 1/278* (2013.01); *H02K 1/28* (2013.01)

(58) Field of Classification Search
CPC ............. H02K 1/278; H02K 1/28; H02K 1/32
See application file for complete search history.

(56) References Cited

U.S. PATENT DOCUMENTS

| | | | |
|---|---|---|---|
| 5,939,809 A | 8/1999 | Möbius | |
| 9,735,636 B2 | 8/2017 | Tanaka et al. | |
| 2012/0001508 A1* | 1/2012 | Mantere | H02K 1/2786 |
| | | | 310/156.12 |
| 2012/0074807 A1* | 3/2012 | Burton | H02K 1/278 |
| | | | 310/156.28 |
| 2016/0141929 A1* | 5/2016 | Arimatsu | H02K 1/30 |
| | | | 310/156.12 |
| 2018/0191213 A1* | 7/2018 | Buehler | H02K 29/03 |

FOREIGN PATENT DOCUMENTS

| | | | |
|---|---|---|---|
| JP | 11308794 A | | 11/1999 |
| JP | 11512918 A | | 11/1999 |
| JP | 2010233325 A | * | 10/2010 |
| JP | 2015130780 A | | 7/2015 |
| JP | 2017195751 A | | 10/2017 |

OTHER PUBLICATIONS

Machine Translation, Masuda, JP-2010233325-A, Oct. 2010. (Year: 2010).*

* cited by examiner

*Primary Examiner* — Thomas Truong
(74) *Attorney, Agent, or Firm* — RatnerPrestia

(57) ABSTRACT

A rotor capable of suppressing cogging torque and heat build-up caused when an electric motor is operated. The rotor includes a sleeve fixed to a radially outside of a rotary shaft, a plurality of magnets disposed around a radially outside of the sleeve, and a reinforcing member having a cylindrical shape that surrounds the plurality of magnets while being in contact with an outer surface of each of the plurality of magnets to hold the plurality of magnets with the sleeve, each of the plurality of magnets including a central portion in a circumferential direction, in contact with the sleeve, and an end portion in the circumferential direction, having a thickness less than that of the central portion and forming a gap with the sleeve.

10 Claims, 13 Drawing Sheets

ROTOR OF ELECTRIC MOTOR AND ELECTRIC MOTOR

CROSS-REFERENCE TO RELATED APPLICATIONS

This application is a new U.S. Patent Application that claims benefit of Japanese Patent Application No. 2019-078662, filed Apr. 17, 2019, the disclosure of which is incorporated herein by reference in its entirety for all purposes.

BACKGROUND OF THE INVENTION

1. Field of the Invention

The present invention relates to a rotor of an electric motor and an electric motor including the rotor.

2. Description of the Related Art

An electric motor in which a magnet is held between a sleeve and a reinforcing member (e.g., JP 2017-195751 A) is known.

In the related art, there is a demand for a technique for suppressing cogging torque and heat build-up caused when an electric motor is operated.

SUMMARY OF THE INVENTION

In an aspect of the present disclosure, a rotor of an electric motor includes a sleeve fixed radially outside of a rotary shaft; a plurality of magnets disposed radially outside of the sleeve; and a cylindrical reinforcing member surrounding the plurality of magnets so as to contact with outer surfaces of the plurality of magnets, and holding the plurality of magnets between the sleeve and the reinforcing member. Each of the plurality of magnets includes a central portion in a circumferential direction, which contacts with the sleeve; and an end portion in the circumferential direction, which has a thickness smaller than that of the central portion and which forms a gap between the sleeve and the end portion.

According to the present disclosure, restraint of generation of cogging torque and heat during operation of the electric motor, application of the electric motor to a high rotation speed application, facilitation of a manufacturing process of the rotor, and prevention of closing of the gap due to deformation of the magnet can be achieved together.

DETAILED DESCRIPTION

Figure 1:
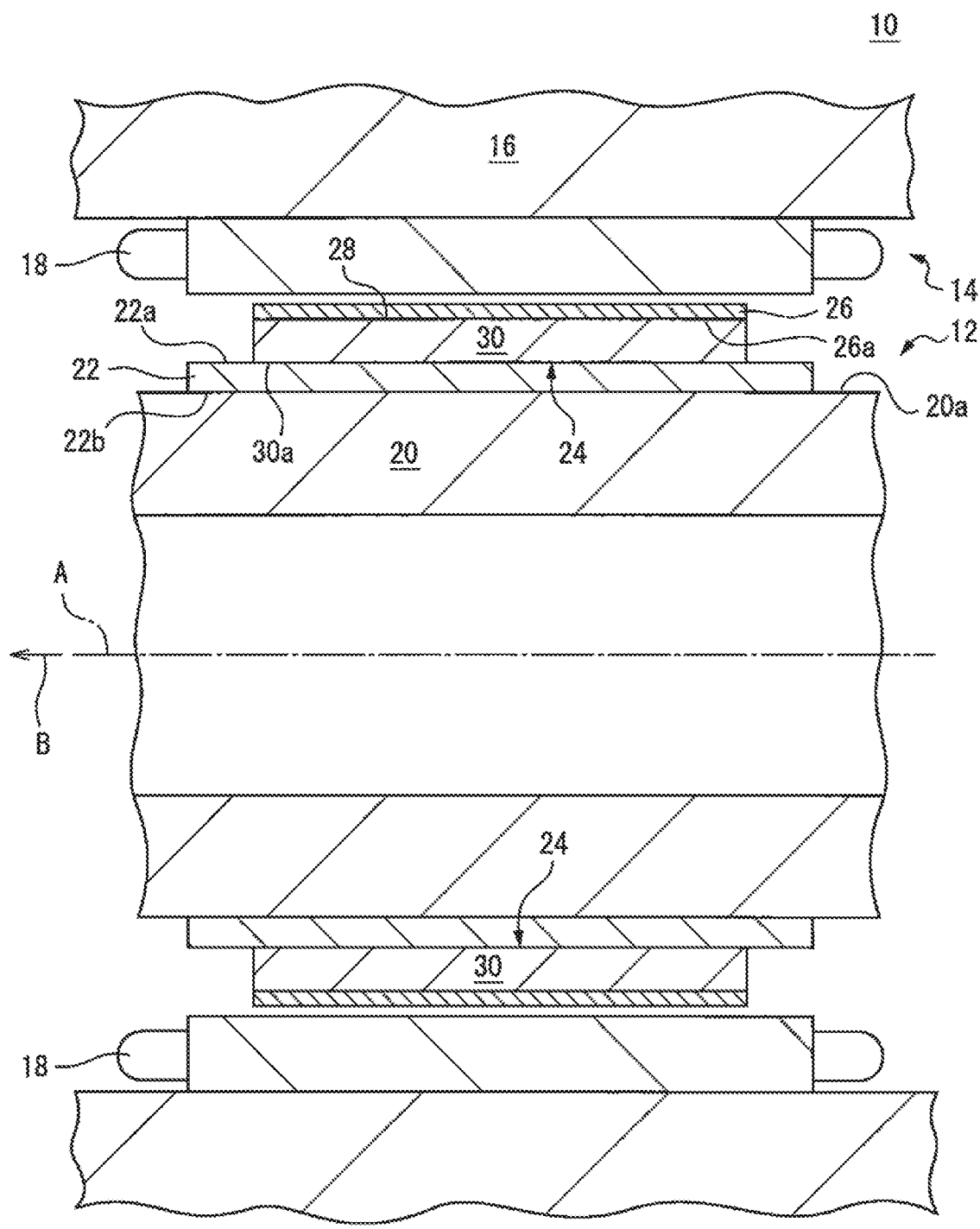
FIG. 1 is a cross-sectional view of an electric motor according to an embodiment, taken along a flat surface parallel to a rotation axis of a rotor.

Embodiments of the present, disclosure will now be described in detail with reference to the drawings. In the various embodiments described below, similar elements are assigned the same reference numerals, and redundant description thereof will be omitted. Further, in the following description, an axial direction indicates a direction along a rotation axis A of a rotor 12, a radial direction indicates a radial direction of a circle centered about the rotation axis A, and a circumferential direction indicates a circumferential direction of the circle. Further, for convenience, the direction indicated by arrow B in FIG. 1 is referred to as the axially frontward direction, and the direction indicated by arrow C in FIG. 2 is referred to as one direction of the circumferential direction, while the direction opposite the arrow C is referred to as the other direction of the circumferential direction.

Figure 2:
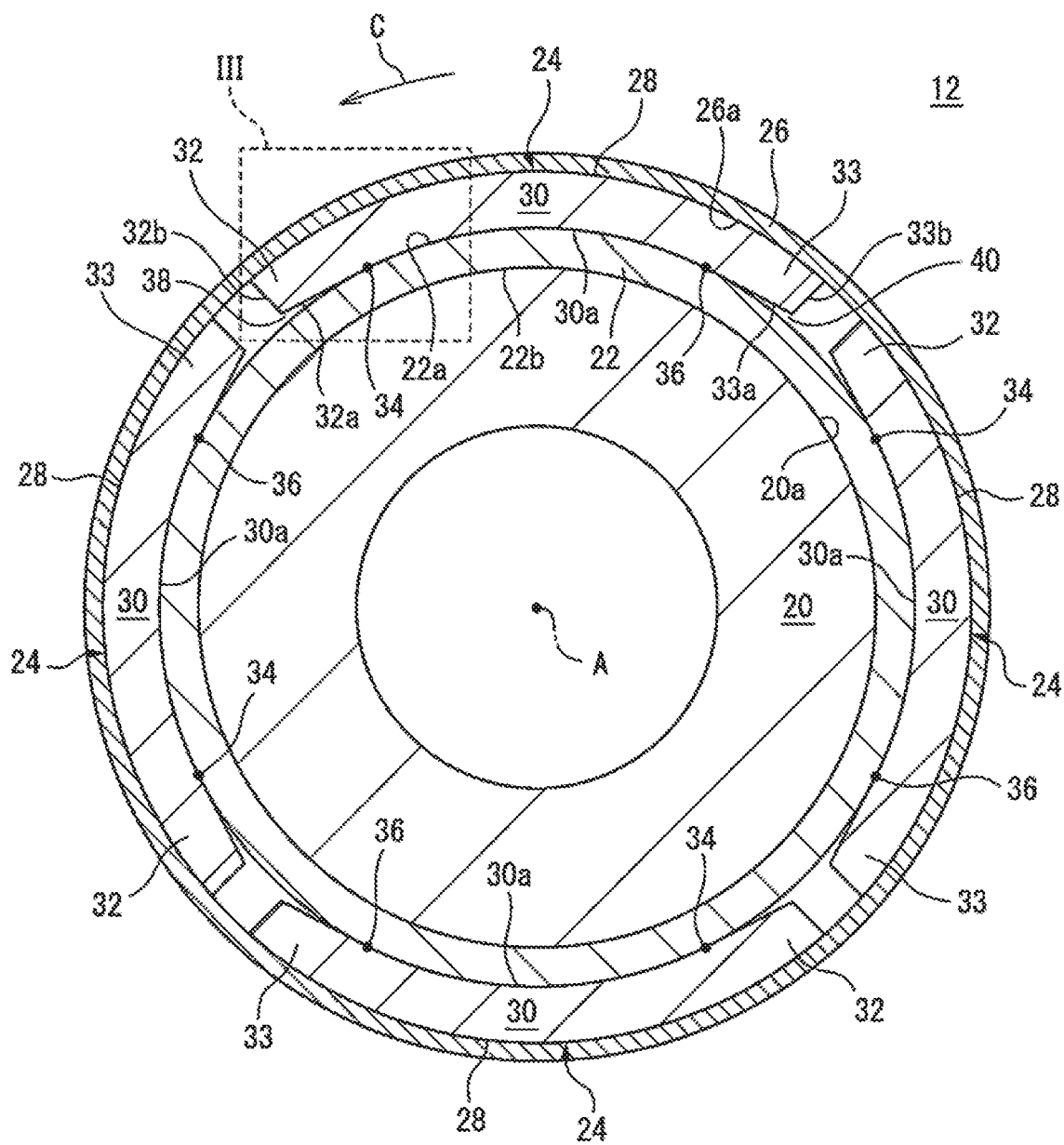
FIG. 2 is a cross-sectional view of the rotor illustrated in FIG. 1 taken along a flat surface orthogonal to the rotation axis.

With reference to FIG. 1, an electric motor 10 according to an embodiment will be first described. The electric motor 10 includes a rotor 12, a stator 14, and a housing 16. The rotor 12 is disposed radially inside of the stator 14 so as to be rotatable about the rotation axis A. The stator 14 is fixed to the housing 16. A coil 18 is wound in the stator 14. The rotor 12 is rotated about the axis A under force from a rotational magnetic field generated by voltage applied to the coil 18.

Next, the rotor 12 will be described with reference to FIG. 2 to FIG. 4. The rotor 12 includes a rotary shaft 20, a sleeve 22, a plurality of magnets 24, and a reinforcing member 26. The rotary shaft 20 is a hollow member having a circular-cylindrical outer circumferential surface 20a, and extends in the axial direction. A distal end (not illustrated) of the rotary shaft 20 is connected to an external structure, such as a drive shaft of a robot or a cutting tool of a machine tool, and outputs a rotational force to the external structure.

The sleeve 22 is fixed on the outer circumferential surface 20a of the rotary shaft 20. In the present embodiment, the sleeve 22 has a circular-cylindrical shape, and includes an outer circumferential surface 22a and an inner circumferential surface 22b opposite the outer circumferential surface 22a. The outer circumferential surface 22a and the inner circumferential surface 22b are each a circular-cylindrical surface. The sleeve 22 is fixed on the outer circumferential surface 20a of the rotary shaft 20 by e.g. an interference fit, so as to be unrotatable relative to the outer circumferential surface 20a.

The magnet 24 is disposed radially outside of the sleeve 22. In the present embodiment, a total of four magnets 24 are disposed to align in the circumferential direction at substantially equal intervals. Each magnet 24 is made of e.g. ferrite or neodymium, and includes an arc-shaped outer surface 28.

The reinforcing member 26 has a circular-cylindrical shape, and surrounds the magnets 24 from radially outside so as to contact with the outer surface 28 of each magnet 24 and holds the magnets 24 between the sleeve 22 and the reinforcing member 26. The reinforcing member 26 is formed of e.g. a reinforced resin such as a glass-fiber reinforced resin (GFRP) or a carbon fiber reinforced resin (CFRP).

Figure 3:
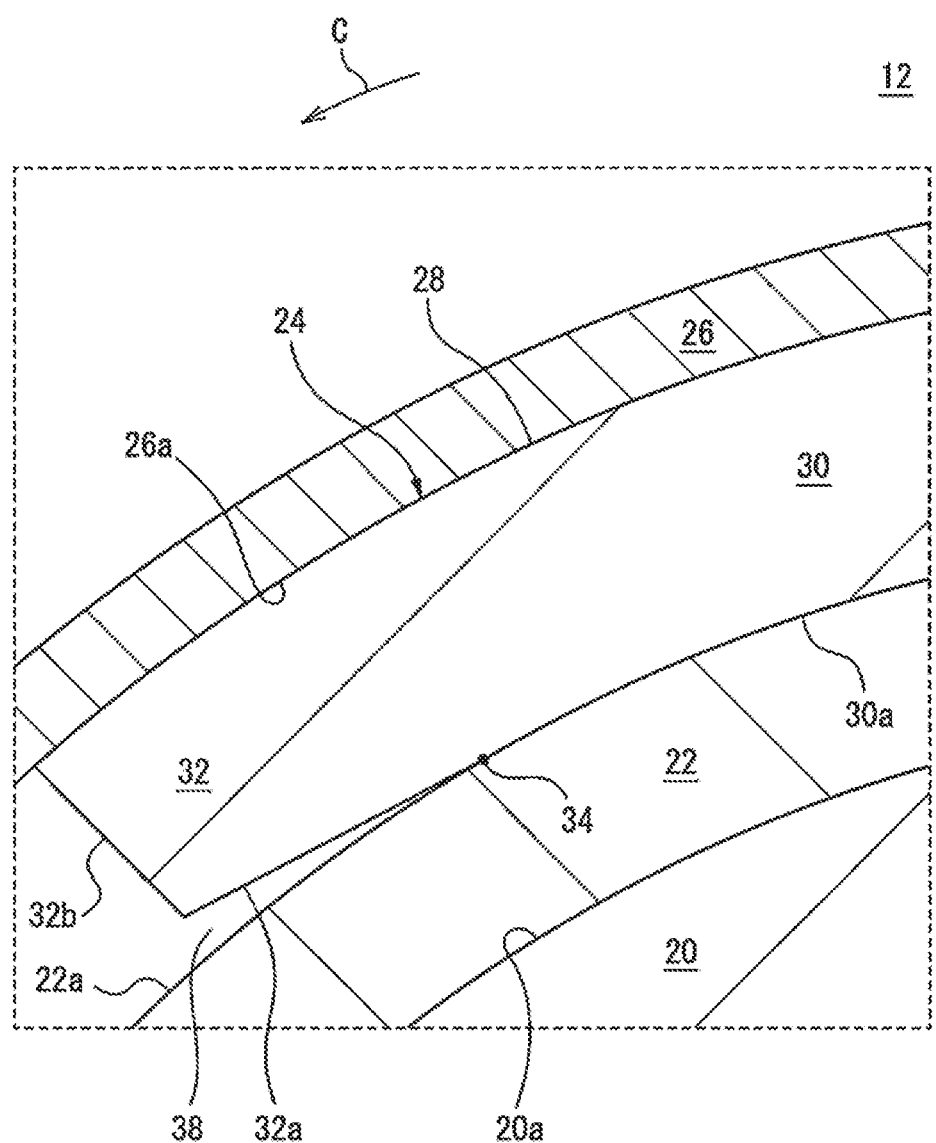
FIG. 3 is an enlarged view of a region III in FIG. 2.
Figure 4:
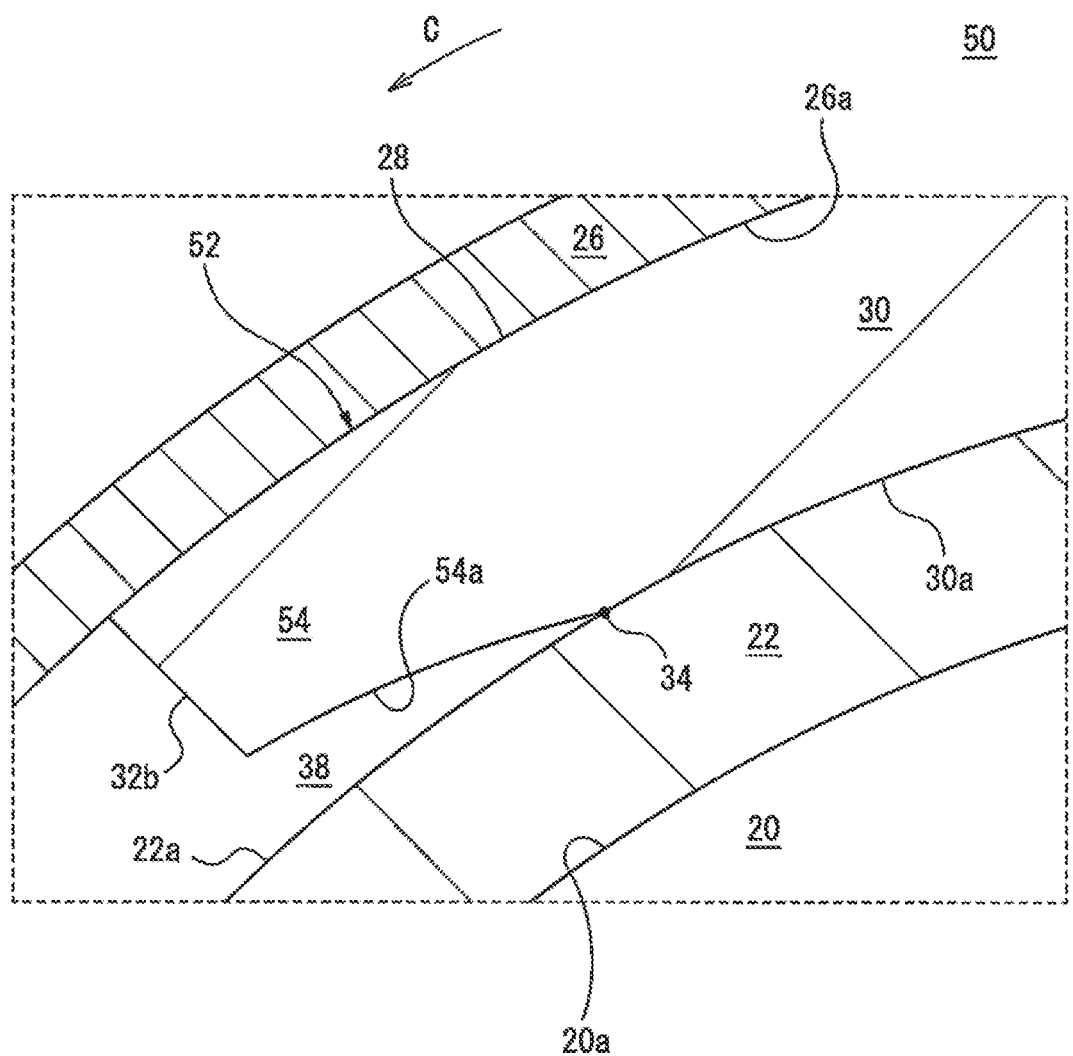
FIG. 4 is a cross-sectional view of a rotor according to another embodiment, corresponding to FIG. 3.

The reinforcing member 26 includes a circular-cylindrical inner circumferential surface 26a, and having a radius of curvature the same as the outer surface 28 of each magnet 24 in a state in which the rotor 12 is assembled as illustrated in FIG. 1 to FIG. 3. That is, in a state in which the rotor 12 assembled, the inner circumferential surface 26a of the reinforcing member 26 and the outer surface 28 of each magnet 24 have the same shape as each other, and the substantially entirety of the outer surface 28 of each magnet 24 is in surface-contact with the inner circumferential surface 26a.

Next, a method of manufacturing the rotor 12 will be described briefly. First, a manufacturer provides the sleeve 22, the plurality of magnets 24, and the reinforcing member 26. The inner circumferential surface 26a of the reinforcing member 26 provided at this time may have a radius of curvature smaller than the outer surface 28 of the magnet 24. The manufacturer then disposes the magnets 24 radially outside of the sleeve 22, and fits the reinforcing member 26 radially outside of the plurality of magnets 24 so as to surround the plurality of magnets 24. Then, the manufacturer inserts the rotary shaft 20 into the sleeve 22, and fixes the sleeve 22 on the outer circumferential surface 20a of the rotary shaft 20, using an interference fit technique such as shrink-fitting or cold-fitting, for example.

At this time, the reinforcing member 26 is elastically deformed to slightly expand radially outward by the magnets 24, and tightens the magnets 24 radially inward due to a reaction force of the reinforcing member 26. The amount of elastic deformation radially outward of the reinforcing member 26 at this time is referred to as an interference. By elastically deforming the reinforcing member 26 with a predetermined interference to tighten the magnets 24 in this way, the magnets 24 can be firmly held between the sleeve 22 and the reinforcing member 26.

As illustrated in FIG. 2 and FIG. 3, each of the magnets 24 includes a central portion 30 in the circumferential direction, and end portions 32 and 33 in the circumferential direction, which are provided on both sides in the circumferential direction of the central portion 30. The central portion 30 includes an inner surface (first inner surface) 30a which contacts with the outer circumferential surface 22a of the sleeve 22. The inner surface 30a is an arc surface extending in the circumferential direction from an end edge 34 in one direction of the circumferential direction to an end edge 36 in the other direction of the circumferential direction, and the entirety of the inner surface 30a is in surface-contact with the outer circumferential surface 22a of the sleeve 22.

In a state in which the rotor 12 is assembled as illustrated in FIG. 1 to FIG. 3, the inner surface 30a has a radius of curvature the same as the outer circumferential surface 22a of the sleeve 22. In the present embodiment, a width of the center portion 30 in the circumferential direction is set to ⅓ or more of an overall width of the magnet 24 in the circumferential direction. However, the width of the central portion 30 in the circumferential direction may be set to less than ⅓ of the overall width of the magnet 24 in the circumferential direction.

The end portion 32 is integrally provided on one side in the circumferential direction of the central portion 30, and has a radial thickness smaller than the central portion 30, thereby forming a gap 38 between the sleeve 22 and the end portion 32. More specifically, the end portion 32 includes an inner surface (second inner surface) 32a and an end surface 32b in one direction of the circumferential direction. The inner surface 32a is connected to the inner surface 30a of the central portion 30 at the end edge 34, and extends from the end edge 34 to the end surface 32b so as to form the gap 38.

In the present embodiment, the inner surface 32a is a flat surface extending so as to make the gap 38 be wider from the end edge 34 toward the end surface 32b. The end surface 32b is flat surface defining an end of the magnet 24 in one direction of the circumferential direction. The end portion 32 can be defined as a portion of the magnet 24 located on a side of the end edge 34 in one direction of the circumferential direction (or a circumferential section of the magnet 24 that is spaced from the sleeve 22 via the gap 38).

The end portion 33 is integrally provided on the other side in the circumferential direction of the central portion 30, and has a radial thickness smaller than the central portion 30 similar as with the end portion 32, thereby forming a gap 40 between the sleeve 22 and the end portion 33. The end portion 33 has a shape symmetrical to the end portion 32 with respect to a virtual flat surface which is parallel to the axial direction and which passes through the center of the central portion 30 and the axis A. Specifically, the end portion 33 includes an inner surface (second inner surface) 33a and an end surface 33b in the other direction of the circumferential direction. The inner surface 33a is connected to the inner surface 30a of the central portion 30 at the end edge 36, and extends from the end edge 36 to the end surface 33b so as to form the gap 40.

In the present embodiment, the inner surface 33a is a flat surface extending so as to make the gap 40 be wider from the end edge 36 toward the end surface 33b. The end surface 33b is a flat surface defining an end of the magnet 24 in the other direction of the circumferential direction. The end portion 33 can be defined as a portion of the magnet 24 located on a side of the end edge 36 in the other direction of the circumferential direction (or a circumferential section of the magnet 24 that is spaced from the sleeve 22 via the gap 40).

The outer surface 28 of the magnet 24 is defined by an outer surface of the central portion 30 and outer surfaces of the end portions 32 and 33. In the present embodiment, the end portions 32 and 33 are entirely spaced radially outward from the sleeve 22, whereby the gaps 38 and 40 are formed over the entire axial areas of the end portions 32 and 33, respectively.

As described above, in the present embodiment, the end portions 32 and 33 of the magnet 24 each have a smaller radial thickness than the central portion 30, thereby forming the gaps 38 and 40 between the sleeve 22 and them. According to this configuration, magnetic flux generated in the end portions 32 and 33 can be reduced than that generated in the central portion 30, due to which, it is possible to moderate a degree of change in magnetic flux interlinked with the coil 18 (partial differentiation of magnetic flux) when the end portions 32 and 33 pass through the coil 18 of the stator 14 facing the end portions 32 and 33 during operation of the electric motor 10. Accordingly, it is possible to restrain the generation of the cogging torque during operation of the electric motor 10 and of the heat due to the eddy current.

On the other hand, the outer surface 28 of the magnet 24 has the same shape as the inner circumferential surface 26a of the reinforcing member 26, and is in surface-contact with the inner circumferential surface 26a over the substantially entire region thereof. According to this configuration, an interference of the reinforcing member 26 can be minimized. Thus, the magnet 24 can be tightened by the reinforcing member 26 with an appropriate interference while preventing breaking of the reinforcing member. Due to this, it is possible to advantageously apply the electric motor 10 to high-speed rotation application. Further, since an interference of the reinforcing member 26 can be easily set, it is possible to facilitate a manufacturing process of the rotor 12.

Further, since the force to tighten the magnet 24 by the reinforcing member 26 can be uniform in the circumferential direction, it is possible to prevent the end portions 32 and 33 of the magnet 24 from being deformed radially inward so as to close the gaps 38 and 40 by the excessive force applying to the end portions 32 and 33 from the reinforcing member 26. As stated above, according to the present embodiment, it is possible to achieve the restraint of generation of the cogging torque and the heat, the application to the high-speed rotation application, the facilitation of the manufacturing process, and prevention of closing of the gaps 38 and 40 due to deformation of the magnet 24, together.

Further, in the present embodiment, the inner surface 30a of the central portion 30 of the magnet 24 is an arc surface having the same radius of curvature as the outer circumferential surface 22a of the sleeve 22. According to this configuration, the contact area between the inner surface 30a and the outer circumferential surface 22a can be increased, whereby it is possible to increase the friction between the inner surface 30a and the outer circumferential surface 22a. As a result, the magnet 24 can be effectively prevent from being displaced relative to the sleeve 22 during operation of the electric motor 10.

In addition, in the present embodiment, the center portion 30 has the width in the circumferential direction set to ⅓ or more of the overall width of the magnet 24 in the circumferential direction. If a ratio of the widths of the central portion 30 and the magnet 24 in the circumferential direction is set in this way, a sufficient contact area between the inner surface 30a and the outer circumferential surface 22a can be ensured, and thus, it is possible to more effectively prevent the magnet 24 from being displaced relative to the sleeve 22 during operation of the electric motor 10.

Note that the inner surface 32a or 33a of the end portion 32 or 33 is not limited to a flat surface, but may be a curved surface. Such an embodiment will be described with reference to FIG. 4 and FIG. 5. A rotor 50 illustrated in FIG. 4 differs from the above-described rotor 12 in a configuration of a magnet 52. Specifically, the magnet 52 includes a central portion 30, an end portion 54 in one direction of the circumferential direction, and an end portion (not illustrated) in the other direction of the circumferential direction.

The end portion 54 has a radial thickness smaller than the central portion 30. More specifically, the end portion 54 includes the end surface 32b in one direction of the circumferential direction, and an inner surface (second inner surface) 54a. The inner surface 54a extends from the end edge 34 to the end surface 32b so as to form the gap 38. In the present embodiment, the inner surface 54a is a concave-curved surface recessed inward of the end portion 54, and curvedly extends so as to make the gap 38 be wider from the end edge 34 toward the end surface 32b.

The inner surface 54a may be an arc surface having a predetermined radius of curvature, or may be any curved surface (such as a combination of multiple arc-shaped surfaces), for example. Although not illustrated, the end portion of the magnet 52 in the other direction of the circumferential direction has a shape symmetrical to the end portion 54 with respect to a virtual flat surface which is parallel to the axial direction and which passes through the center of the central portion 30 and the axis A, and includes an inner surface (second inner surface) that is a concave-curved surface similar to the end portion 54.

In the present embodiment, since the inner surface 54a is a concave-curved surface, the thickness of the magnet 52 decreases asymptotically from the end edge 34 toward the end surface 32b. According to this configuration, it is possible to moderate the degree of change in magnetic flux interlinked with the coil 18 (partial differentiation of magnetic flux) when the end portion. 54 (and the end portion in the other direction of the circumferential direction) passes through the coil 18 of the stator 14 facing the end portion 54 (and the other end portion) during operation of the electric motor 10. Due to this, it is possible to more effectively restrain the generation of the cogging torque and the heat.

On the other hand, since the substantially entire region of the outer surface 28 of the magnet 52 is in surface-contact with the inner circumferential surface 26a of the reinforcing member 26, the application to the high-speed rotation application, the facilitation of the manufacturing process, and the prevention of closing of the gaps 38 and 40 due to deformation of the magnet 52, as well as the generation of cogging torque and heat, can be achieved together, similar as the above-described embodiment.

Figure 5:
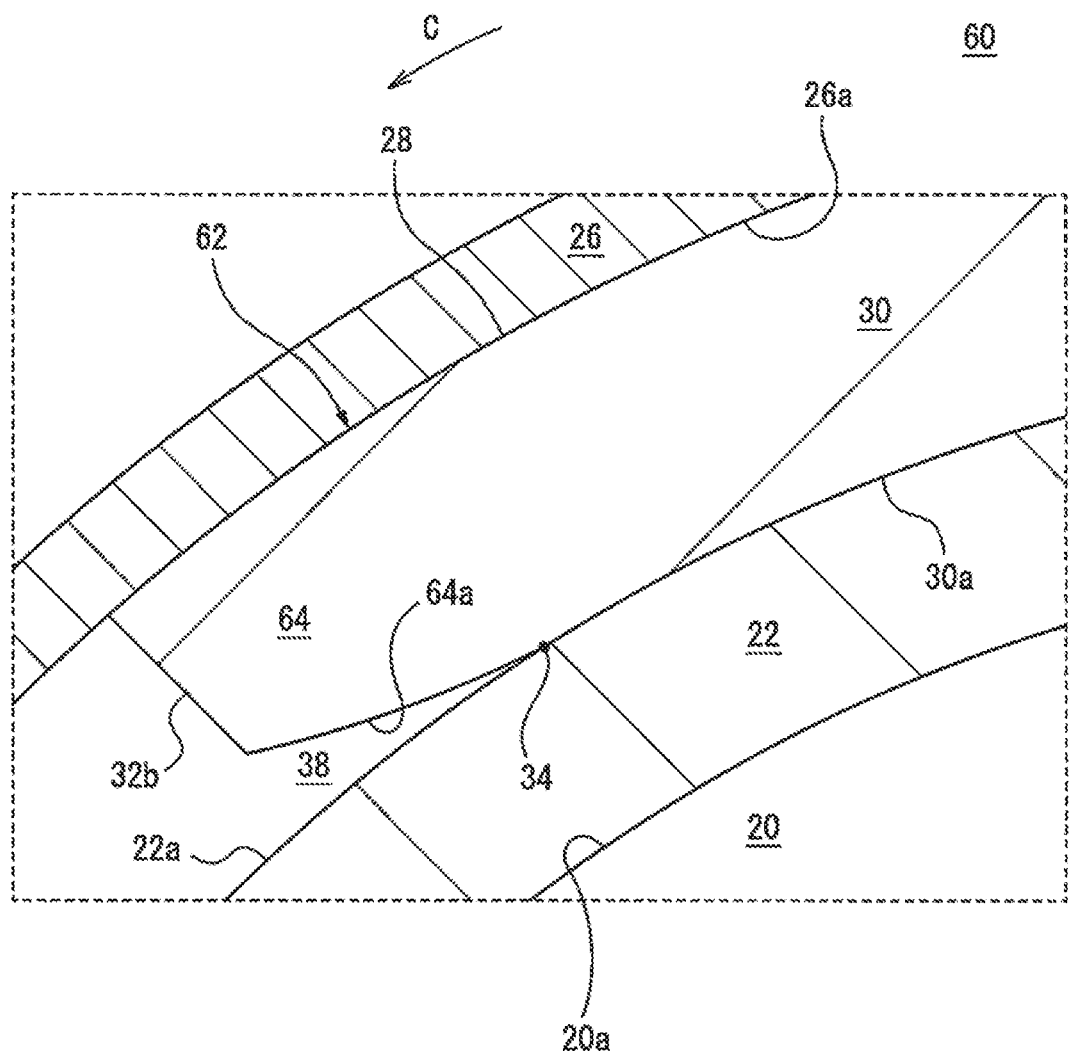
FIG. 5 is a cross-sectional view of a rotor according to yet another embodiment, corresponding to FIG. 3.

A rotor 60 illustrated in FIG. 5 differs from the above-described rotor 50 in an inner surface (second inner surface) 64a of an end portion 64 of a magnet 62. Specifically, the inner surface 64a is a convex-curved surface expanding outward of the end portion 64, and extends so as to make the gap 38 be wider from the end edge 34 toward the end surface 32b. Due to the gap 38, the end portion 64 has a radial thickness smaller than the central portion 30. The inner surface 64a may be an arc surface having a predetermined radius of curvature, or may be any curved surface, for example.

Although not illustrated, an end portion of the magnet 62 in the other direction of the circumferential direction has a shape symmetrical to the end portion 64 with respect to a virtual flat surface parallel to the axial direction and passing through the center of the central portion 30 and the axis A, and includes an inner surface (second inner surface) that is a convex-curved surface similar to the end portion 64. According to the present embodiment, due to the inner surface 64a of convex-curved surface, the radial thickness of the end portion 64 can be partially increased when compared to the embodiments illustrated in FIG. 3 and FIG. 4, whereby it is possible to enhance the strength of the end portion 64.

In the above-described embodiments, the end portion 32, 33, 54, 64 in the circumferential direction of the magnet 24, 52, 62 is spaced away from the sleeve 22 in the entire region thereof. However, a part of an end portion of a magnet in the circumferential direction may be in contact with the sleeve 22. Such an embodiment will be described with reference to FIG. 6 and FIG. 7.

Figure 6:
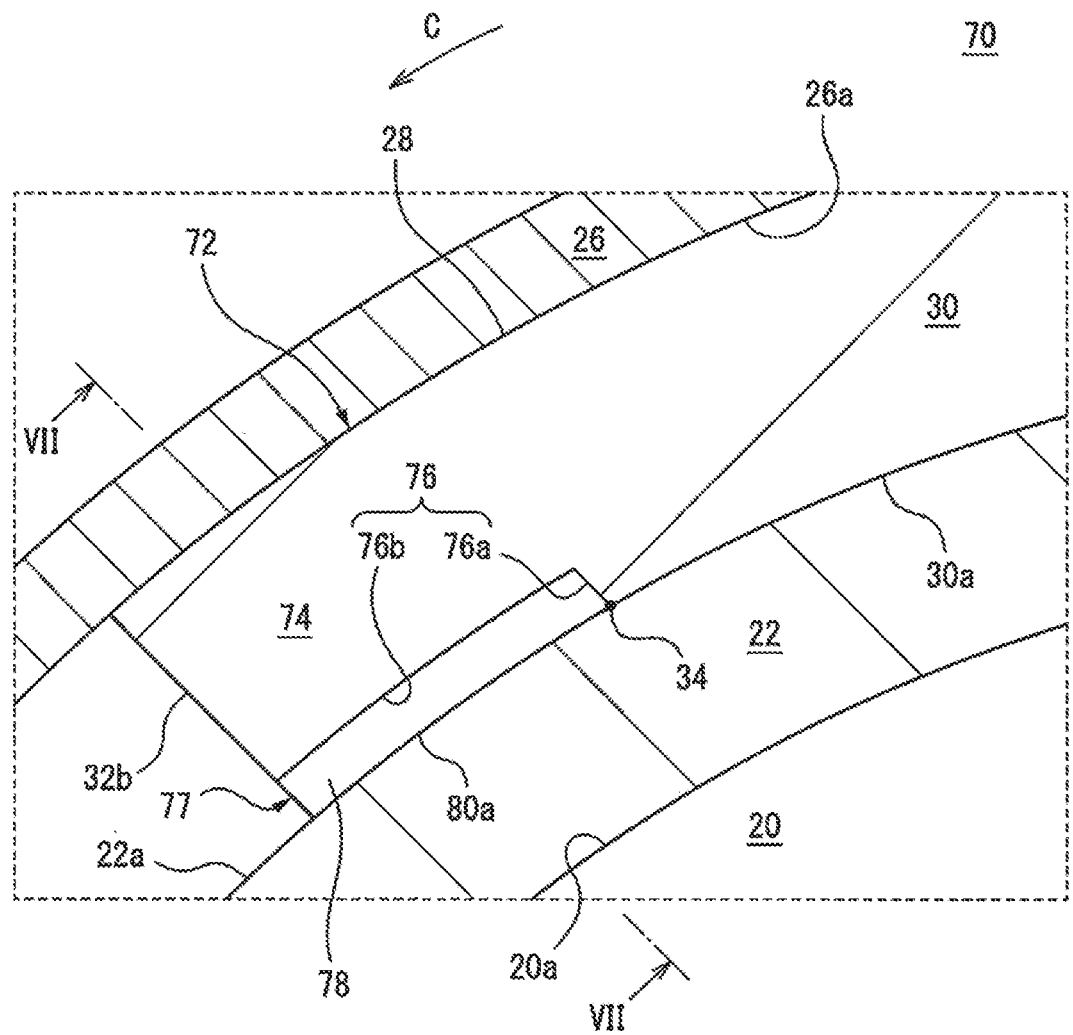
FIG. 6 is a cross-sectional view of a rotor according to yet another embodiment, corresponding to FIG. 3.
Figure 7:
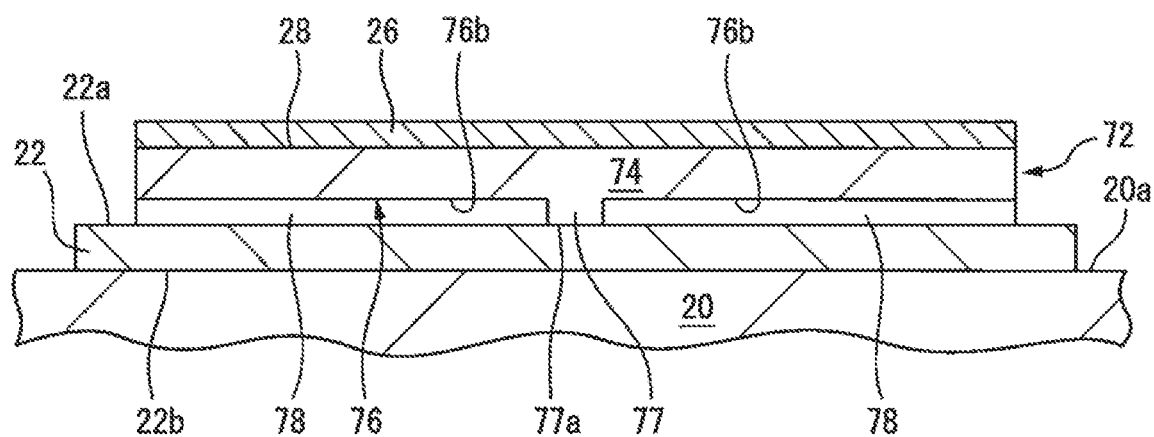
FIG. 7 is a cross-sectional view taken along line VII-VII in FIG. 6.

A rotor 70 illustrated in FIGS. 6 and 7 differs from the above-described rotor 12 in a magnet 72.

Specifically, the magnet 72 includes the central portion 30 in the circumferential direction, an end portion 74 in one direction of the circumferential direction, and an end portion (not illustrated) in the other direction of the circumferential direction. The end portion 74 includes the end surface 32b in one direction of the circumferential direction and an inner surface (second inner surface) 76 extending from the end edge 34 to the end surface 32b. The inner surface 76 includes a radial surface 76a extending radially outward from the end edge 34, and a circumferential surface 76b extending from a radially outer end edge of the radial surface 76a to one direction of the circumferential direction. A gap 78 is formed between the circumferential surface 76b and the outer circumferential surface 22a of the sleeve 22.

In the present embodiment, a protrusion 77 is formed on the circumferential surface 76b of the end portion 74 so as to extend radially inward from the circumferential surface 76b. The protrusion 77 extends in the circumferential direction from the radial surface 76a to the end surface 32b, and is in contact with the outer circumferential surface 22a of the sleeve 22 at its radially inner end surface 77a. By this protrusion 77, the gap 78 is divided rear and front in the axial direction.

In this way, the end portion 74 has a smaller radial thickness than the central portion 30 in an axial section in which the gap 78 is formed (i.e., in an axial section other than the protrusion 77). Note that, although not illustrated, an end portion of the magnet 72 in the other direction of the circumferential direction has a shape symmetrical to the end portion 74 with respect to a virtual flat surface parallel to the axial direction and passing through the center of the central portion 30 and the axis A, and includes an inner surface and a protrusion corresponding to the inner surface 76 and the protrusion 77.

In the present embodiment, since the end portion 74 (and an end portion in the other direction of the circumferential direction) has a smaller radial thickness than the central portion 30 in the section of the gap 78. Thus, similar as the above-described embodiments, it is possible to moderate the degree of change in magnetic flux interlinked with the coil 16 (partial differentiation of magnetic flux) when the end portion 74 (and an end portion in the other direction of the circumferential direction) passes through the coil 18 of the stator 14 facing the end portion 74 (and the other end portion). Due to this, it is possible to effectively restraint the generation of the cogging torque and the heat.

On the other hand, since the substantially entire region of the outer surface 28 of the magnet 72 is surface-contact with the inner circumferential surface 26a of the reinforcing member 26, the restraint of the generation of the cogging torque and the heat, the application to the high-speed rotational application, the facilitation of the manufacturing process, and the prevention of closing of the gap 78 due to deformation of the magnet 72 can be achieved together, similar as the above-described embodiment.

In addition, since the protrusion 77 is in contact with the sleeve 22, the contact area between the magnet 72 and the sleeve 22 can be increased when compared to a case where the protrusion 77 is not formed, whereby the friction between the magnet 72 and the sleeve 22 can be increased. Accordingly, it is possible to effectively prevent the magnet 72 from being displaced relative to the sleeve 22 during operation of the electric motor 10. Moreover, since the gap 78 can be reliably maintained by the protrusion 77, it is possible to reliably prevent the closing of the gap 78 due to deformation of the magnet 72.

Figure 8:
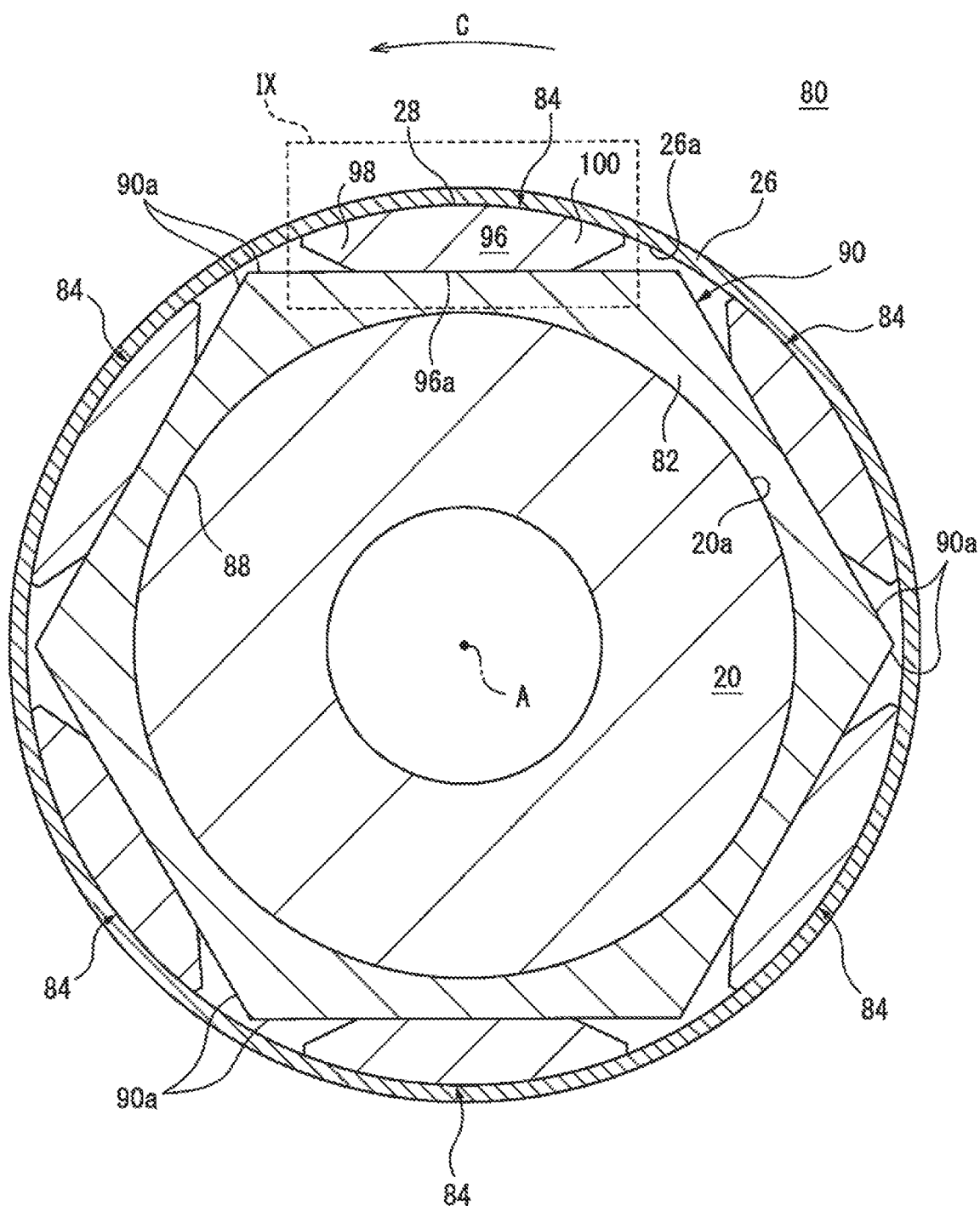
FIG. 8 is a cross-sectional view of a rotor according to yet another embodiment, corresponding to FIG. 2.

In the above-described embodiments, the sleeve 22 has a circular-cylindrical shape. However, the sleeve may have a polygonal outer shape, for example. Such an embodiment will be described with reference to FIG. 8 and FIG. 9. A rotor 80 illustrated in FIG. 8 and FIG. 9 includes the rotary shaft 20, a sleeve 82, a plurality of magnets 84, and the reinforcing member 26.

The sleeve 82 is cylindrical and includes a circular-cylindrical inner circumferential surface 88 and a hexagonal (e.g., regular hexagonal) outer circumferential surface 90.

The outer circumferential surface 90 is defined by a total of six flat surfaces 90a corresponding to respective sides of the hexagon. The magnets 84 are disposed radially outside of the sleeve 82. In the present embodiment, a total of six magnets 84 are disposed on the respective flat surfaces 90a so as to align in the circumferential direction at substantially equal intervals. Each of the magnets 84 includes the arc-shaped outer surface 28. The reinforcing member 26 surrounds the magnets 84 such that the inner circumferential surface 26a thereof contacts with the outer surface 2 between the sleeve 82 and the enforcing member 26.

Figure 9:
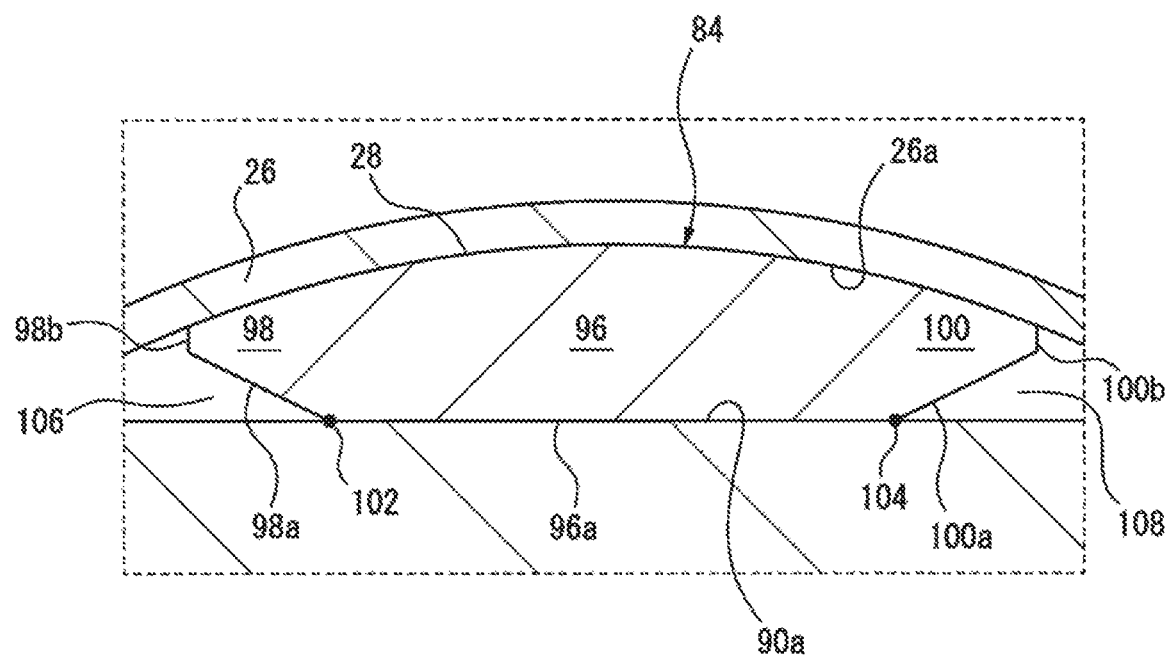
FIG. 9 is an enlarged view of a region IX in FIG. 8.

As illustrated in FIG. 9, the magnet 84 includes a central portions 96 in the circumferential direction, and end portions 98 and 100 in the circumferential direction provided on both sides of the central portion 96. The central portion 96 includes an inner surface (first inner surface) 96a that is in contact with the flat surface 90a of the sleeve 82. The inner surface 96a is a flat surface extending in the circumferential direction from an end edge 102 in one direction of the circumferential direction to an end edge 104 in the other direction of the circumferential direction, wherein the entire region of the inner surface 96a is in surface-contact with the flat surface 90a of the sleeve 82.

A width of the center portion 96 in the circumferential direction (or the right-left direction in FIG. 9) is set to ⅓ or more of an overall width of the magnet 84 in the circumferential direction. However, the width of the central portion 96 in the circumferential direction may be set to less than ⅓ of the overall width of the magnet 84 in the circumferential direction.

The end portion 98 is integrally provided on a side of the central portion 96 in one direction of the circumferential direction, and has a smaller radial thickness than the central portion 96, thereby forming a gap 106 between the sleeve 82 and the end portion 98. More specifically, the end portion 98 includes an inner surface (second inner surface) 98a and an end surface 96b in one direction of the circumferential direction. The inner surface 98a is connected to the inner surface 96a of the central portion 96 at the end edge 102, and extends from the end edge 102 to the end surface 98b so as to form the gap 106.

In the present embodiment, the inner surface 98a is a flat surface inclined with respect to the flat surfaces 90a and 96a, and extending so as to make the gap 106 be wider from the end edge 102 toward the end surface 98b. The end surface 96b is flat surface that is substantially orthogonal to the flat surfaces 90a and 96a, and defines an end of the magnet 84 in one direction of the circumferential direction. The end portion 98 can be defined as a portion of the magnet 84 located on a side (i.e., the left side in FIG. 9) of the end edge 102 in one direction of the circumferential direction (or a circumferential section of the magnet 84 that is spaced from the sleeve 82 via the gap 106).

The end portion 100 is integrally provided on a side of the central portion 96 in the other direction of the circumferential direction, and has a smaller radial thickness than the central portion 96, similar as the end portion 98, thereby forming a gap 108 between the sleeve 82 and the end portion 100. The end portion 100 has a shape symmetrical to the end portion 98 with respect to a virtual flat surface parallel to the axial direction passing through the center of the central portion 96 and the axis A.

Specifically, the end portion 100 includes an end surface 100b that defines an end of the magnet 84 in the other direction of the circumferential direction, and an inner surface (second inner surface) 100a that is a flat surface extending from the end edge 104 to the end surface 100b so as to form the gap 108. The outer surface 28 of the magnet 84 is defined by an outer surface of the central portion 96 and outer surfaces of the end portions 98 and 100.

In the present embodiment, the end portions 98 and 100 of the magnet 84 each have a smaller radial thickness than the central portion 96, by which the gaps 106 and 108 are formed between the sleeve 82 and end portions 98 and 100. According to this configuration, similar as the above-described embodiments, it is possible to moderate a degree of change in magnetic flux interlinked with the coil 18 (partial differentiation of magnetic flux) when the end portions 98 and 100 pass through the coil 18 of the stator 14 facing the end portions 98 and 100 during operation of the electric motor 10. Due to this, the generation of the cogging torque and the heat can be restrained.

On the other hand, since the substantially entire region of the outer surface 28 of the magnet 84 is in surface-contact with the inner circumferential surface 26a of the reinforcing member 26, the application to a high-speed rotation application, the facilitation of the manufacturing process, and the prevention of closing of the gaps 106 and 108 due to deformation of the magnet 84, as well as the restraint of the generation of the cogging torque and the heat, can be achieved together, similar as with the above-described embodiments.

Figure 10:
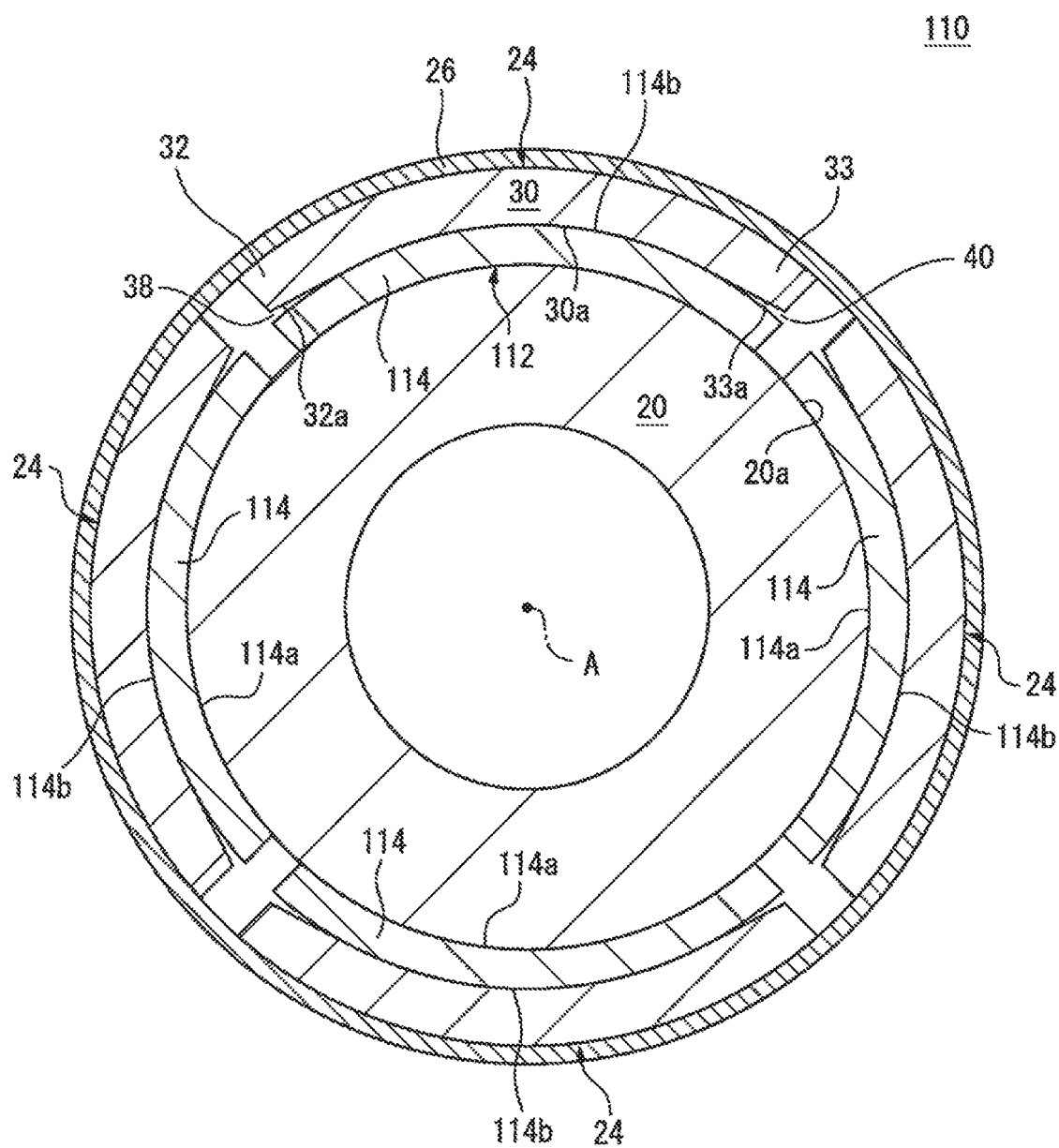
FIG. 10 is a cross-sectional view of a rotor according to yet another embodiment, corresponding to FIG. 2.

In the above-described embodiments, the sleeve 22, 82 is cylindrical. However, the sleeve may be divided into a plurality of segments in the circumferential direction. Such an embodiment is illustrated in FIG. 10. A rotor 110 illustrated in FIG. 10 differs from the above-described rotor 12 in a sleeve 112.

The sleeve 112 includes a plurality of sleeve segments 114 separated in the circumferential direction. In the present embodiment, a total of four sleeve segments 114 are aligned in the circumferential direction at substantially equal intervals. Each of the sleeve segments 114 includes an inner surface 114a contacting the outer circumferential surface 20a of the rotation shaft 20, and an outer surface 114b opposite the inner surface 114a. The inner surface 114a and the outer surface 114b are arc surfaces that are substantially parallel to each other.

The magnets 24 are disposed one by one on the outer surfaces 114b of the respective sleeve segments 114. The end portions 32 and 33 of the magnet 24 form gaps 38 and 40 between the outer surface 114b and the end portions 32 and 33, respectively. According to the present embodiment, the restraint of the generation of the cogging torque and the heat, the application to a high-speed rotation application, the facilitation of the manufacturing process, and the prevention of closing of the gaps 38 and 40 due to deformation of the magnet 24 can be achieved together, similar as the above-described embodiments.

Note that, a connection between the inner surface 30a, 96a of the central portion 30, 96 and the inner surface 32a, 33a, 54a, 64a, 76, 98a, 100a of the end portion 32, 33, 54, 64, 74, 98, 100 may has a chamfer or roundness. Such a embodiment will be described with reference to FIGS. 11 and 12.

Figure 11:
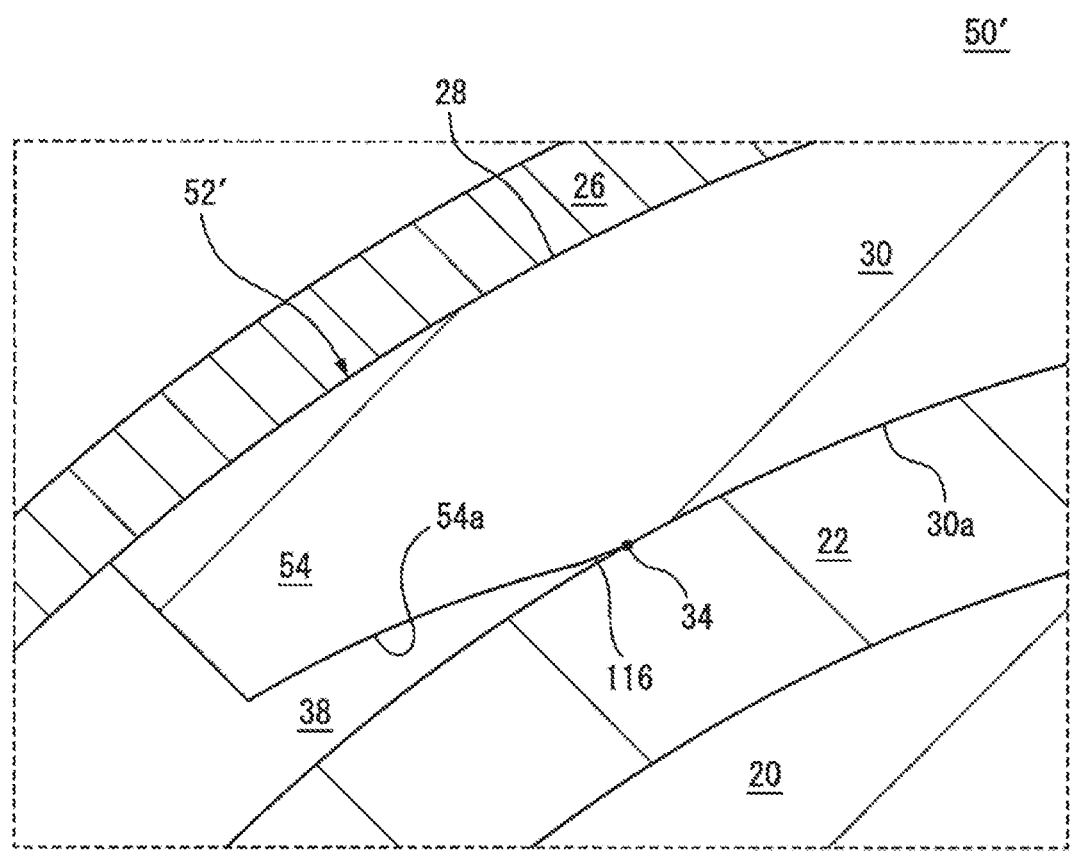
FIG. 11 is a cross-sectional view of a rotor according to yet another embodiment, corresponding to FIG. 4.

A rotor 50' illustrated in FIG. 11 is a modification of the above-described rotor 50. In the rotor 50', a chamfer 116 is formed at a connection between the inner surface 54a of the end portion 54 and the inner surface 30a of the central section. 30 of a magnet 52'. This prevents a sharp corner from being formed at the connection between the inner surface 54a and the inner surface 30a, and allows the inner surface 54a and the inner surface 30a to be relatively smoothly connected.

Figure 12:
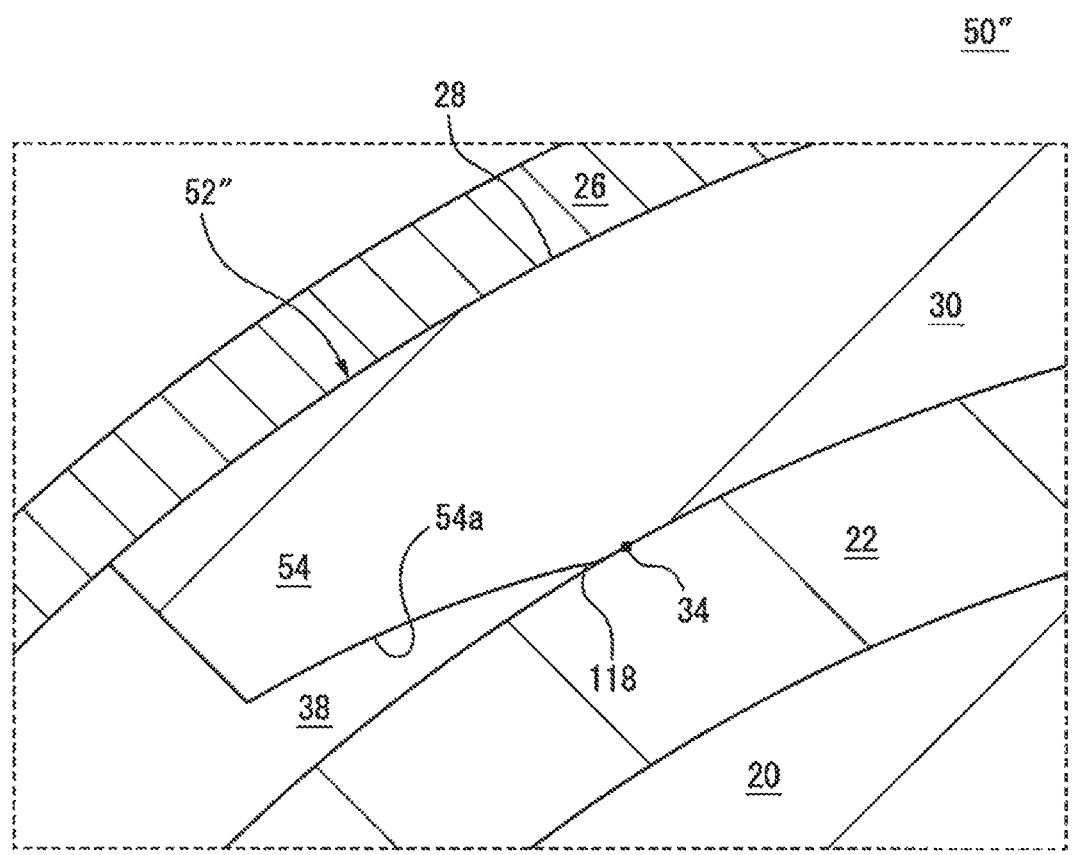
FIG. 12 is a cross-sectional view of a rotor according to yet another embodiment, corresponding to FIG. 4.

On the other hand, in a rotor 50'' illustrated in FIG. 12, a rounded corner 118 (a so-called fillet) is formed at a connection between the inner surface 54a of the end portion 54 and the inner surface 30a of the central portion 30 of the magnet 52''. This prevents a sharp corner from being formed at the connection between the inner surface 54a and the inner surface 30a, and allows the inner surface 54a and the inner surface 30a to be smoothly connected.

By connecting the inner surface 54a and the inner surface 30a smoothly as illustrated in FIG. 11 and FIG. 12, it is possible to more effective moderate the degree of change in magnetic flux interlinked with the coil 18 (partial differentiation of magnetic flux) when the end portion 54 passes through the coil 18 of the stator 14 facing the end portion 54 during operation of the electric motor 10, and also to prevent stress concentration from occurring at the connection between the inner surface 54a and the inner surface 30a. It will be understood that the chamfer 116 illustrated in FIG. 11 or the rounded corner 118 illustrated in FIG. 12 can be applied to the rotor 12, 60, 70, 80, or 110 described above.

In the embodiments described above, the entire outer surface 28 of the magnet 24, 52, 52', 52'', 62, 72, 64 is in surface-contact with the inner circumferential surface 26a of the reinforcing member 26. However, the outer surface of the magnet may be spaced from the inner circumferential surface of the reinforcing member at its circumferential end portion. Such an embodiment be described with reference to FIG. 13.

Figure 13:
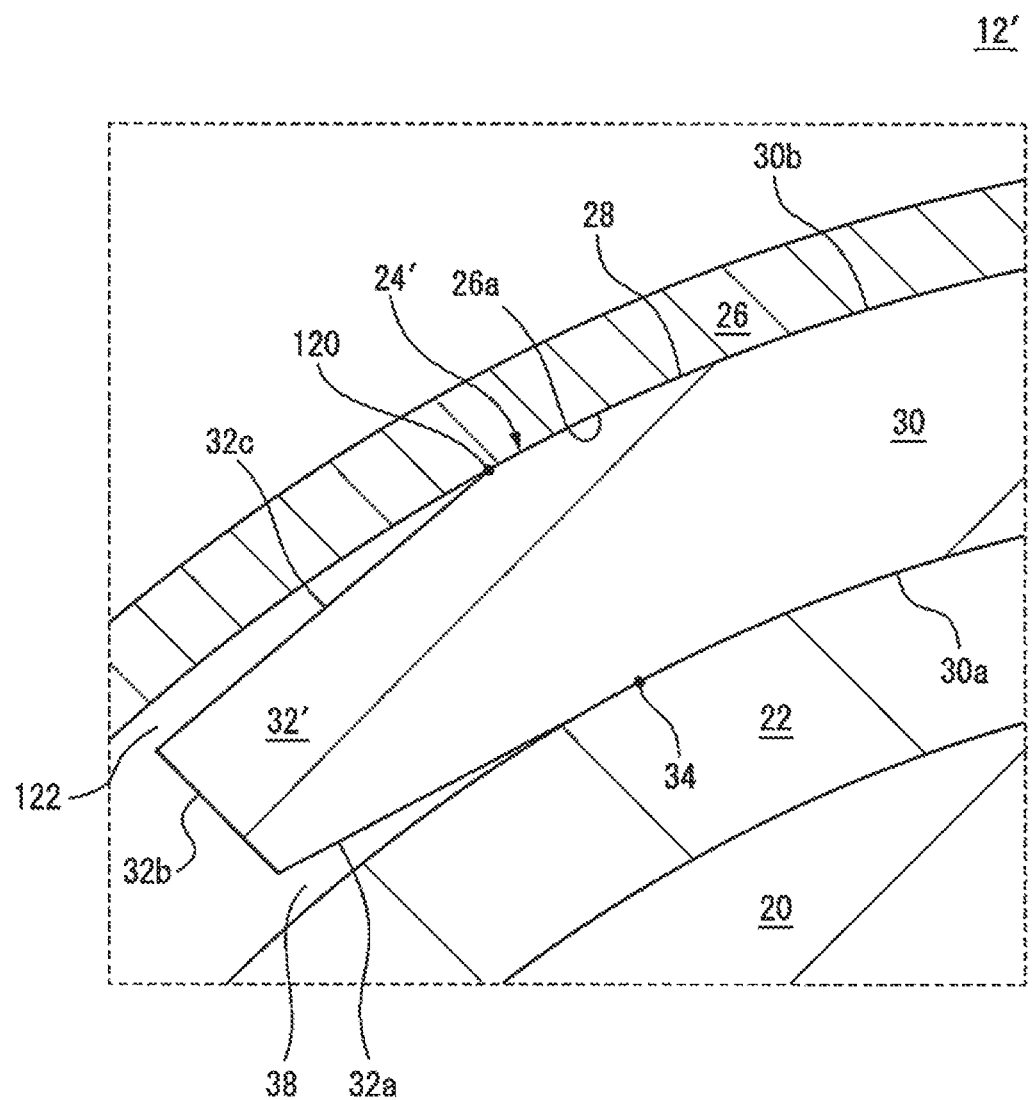
FIG. 13 is a cross-sectional view of a rotor according to yet another embodiment, corresponding to FIG. 3.

A rotor 12' illustrated in FIG. 13 is a modification of the above-described rotor 12, differs from the rotor 12 in an end portion 32'. Specifically, the end portion 32' includes an outer surface 32c, in addition to the inner surface 32a and the end surface 32b. The outer surface 32c extends from an end edge 120 in one direction of the circumferential direction of the outer surface 30b of the central portion 30 to the end surface 32b so as to form a gap 122.

Thus, in the present embodiment, the end portion 32' is spaced away from the inner circumferential surface 26a of the reinforcing member 26, while the entire region of the outer surface 30b of the central portion 30 is in surface-contact with the inner circumferential surface 26a of the reinforcing member 26. Note that, although not illustrated, an end portion 33' of the magnet 24' in the other direction of the circumferential direction may also have an outer surface corresponding to the outer surface 32c. It will be understood that the outer surface 32c of the end portion 32' and the gap 122 defined thereby according to the present embodiment can be applied to the rotor 50, 50', 50'', 60, 70, 80, or 110 described above.

The number of magnets 24, 24', 52, 52', 52'', 62, 72, 84 is not limited to the above-described embodiments, but any number may be used. In addition, the other end portion 33, 100 in the circumferential direction of the magnet 24, 24', 52, 52', 52'', 62, 72, 84 may be eliminated so that only one end portion 32, 32', 54, 64, 74, 98 in the circumferential direction of the magnet 24, 24', 52, 52', 52'', 62, 72, 84 may be spaced apart from the sleeve 22, 82, 112 so as to form the gap 38, 78, 106. In this case, the magnet may come into contact with the corresponding sleeve at its end in the other direction of the circumferential direction. Further, features of the various embodiments described above can be combined with each other. For example, the protrusion 77 illustrated in FIG. 6 may be applied to the embodiments illustrated in FIG. 3 to FIG. 5.

Although the present disclosure has been described above through the embodiments, the embodiments described above are not intended to limit the claimed invention.

The invention claimed is:

1. A rotor of an electric motor, comprising:
a sleeve fixed radially outside of a rotary shaft;
a plurality of magnets disposed radially outside of the sleeve; and
a cylindrical reinforcing member surrounding the plurality of magnets so as to contact with outer surfaces of the plurality of magnets, and holding the plurality of magnets between the sleeve and the reinforcing member,
wherein each of the plurality of magnets includes:
a central portion in a circumferential direction, which contacts with the sleeve; and
an end portion in the circumferential direction, which has a thickness smaller than that of the central portion and which forms a gap between the sleeve and the end portion,
wherein the end portion of the magnet includes:
a second inner surface extending so as to form the gap; and
a protrusion extending radially inward from the second inner surface so as to contact with the sleeve.

2. The rotor of claim 1, wherein the central portion of the magnet includes a first inner surface contacting with the sleeve, and
the end portion of the magnet includes a second inner surface connected to the first inner surface and extending from the first inner surface to an end of the magnet in the circumferential direction so as to form the gap.

3. The rotor of claim 2, wherein an outer surface of the sleeve is a cylindrical surface, and
the first inner surface is an arc-shaped surface having a radius of curvature equal to that of the outer surface of the sleeve.

4. The rotor of claim 2, wherein the second inner surface is a flat surface or a curved surface which extends from the first inner surface so as to make the gap be wider toward the end.

5. The rotor of claim 4, wherein the curved surface is a concave-curved surface.

6. The rotor of claim 2, wherein a connection between the first inner surface and the second inner surface has a chamfer or a roundness.

7. The rotor of claim 1, wherein an inner surface of the reinforcing member is a cylindrical surface, and
the outer surface of each magnet is an arc-shaped surface having a radius of curvature equal to that of the inner surface of the reinforcing member.

8. The rotor of claim 1, wherein the central portion of the magnet has a width in the circumferential direction which is ⅓ or more of an overall width of the magnet in the circumferential direction.

9. An electric motor comprising the rotor of claim 1.

10. A rotor of an electric motor, comprising:
a sleeve fixed radially outside of a rotary shaft;
a plurality of magnets disposed radially outside of the sleeve; and
a cylindrical reinforcing member surrounding the plurality of magnets so as to contact with outer surfaces of the plurality of magnets, and holding the plurality of magnets between the sleeve and the reinforcing member,
wherein each of the plurality of magnets includes:
a central portion in a circumferential direction, which contacts with the sleeve; and
an end portion on each side of the central portion in the circumferential direction, wherein each end portion has a thickness smaller than that of the central portion and which forms a first gap between the sleeve and the end portion, and
wherein directly adjacent end portions form a second gap between the reinforcing member, the sleeve, and the adjacent end portions.

* * * * *